(12) United States Patent
Zhou et al.

(10) Patent No.: US 12,622,407 B2
(45) Date of Patent: May 12, 2026

(54) PET BEDPAN

(71) Applicant: Libola (Shenzhen) Electronic Technology Co., Ltd., Guangdong (CN)

(72) Inventors: Qunhui Zhou, Guangdong (CN); Jianhua Duan, Guangdong (CN)

( * ) Notice: Subject to any disclaimer, the term of this patent is extended or adjusted under 35 U.S.C. 154(b) by 0 days.

(21) Appl. No.: 18/805,530

(22) Filed: Aug. 15, 2024

(65) Prior Publication Data

US 2026/0026462 A1     Jan. 29, 2026

(51) Int. Cl.
*A01K 1/01*          (2006.01)
(52) U.S. Cl.
CPC .................................. A01K 1/0114 (2013.01)
(58) Field of Classification Search
CPC .................................................... A01K 1/0114
USPC ........................................................ 119/166
See application file for complete search history.

(56) References Cited

U.S. PATENT DOCUMENTS

| | | | | | |
|---|---|---|---|---|---|
| 5,226,388 | A | * | 7/1993 | McDaniel | A01K 1/0114 |
| | | | | | 119/166 |
| 5,477,812 | A | * | 12/1995 | Waters | A01K 1/0114 |
| | | | | | 119/166 |
| 6,202,595 | B1 | * | 3/2001 | Atcravi | A01K 1/0114 |
| | | | | | 119/165 |
| 6,205,954 | B1 | * | 3/2001 | Bogaerts | A01K 1/0114 |
| | | | | | 119/166 |
| 6,378,461 | B1 | * | 4/2002 | Thaler | A01K 1/0114 |
| | | | | | 119/166 |
| 6,951,190 | B2 | * | 10/2005 | Northrop | A01K 1/0114 |
| | | | | | 119/166 |
| 7,017,519 | B1 | * | 3/2006 | Deasy | A01K 1/011 |
| | | | | | 119/166 |
| 7,628,118 | B1 | * | 12/2009 | Nottingham | A01K 1/0114 |
| | | | | | 119/166 |

(Continued)

FOREIGN PATENT DOCUMENTS

| | | | | | |
|---|---|---|---|---|---|
| CN | 111512975 | A | * | 8/2020 | A01K 1/0107 |
| CN | 215074563 | U | * | 12/2021 | |

(Continued)

OTHER PUBLICATIONS

ChillX, "Additional Tips for Re-Attaching the Cleaning Rake for the ChillX AutoEgg Self-Cleaning Litter Box", Aug. 17, 2020, YouTube; https://www.youtube.com/watch?v=glusC4EtuNM (Year: 2020).*

*Primary Examiner* — Kimberly S Berona
*Assistant Examiner* — Erica Michelle Huebner
(74) *Attorney, Agent, or Firm* — Hawaii Patent Services; Nathaniel K. Fedde; Kenton N. Fedde

(57)          ABSTRACT

A pet bedpan includes a box body, and a cat litter area and a cat excrement area are arranged in the box body. A collection bin for collecting cat excrement is mounted in the cat excrement area, a bin lid capable of flipping up and down is arranged in the cat excrement area, and a movable shaft that moves back and forth is arranged in the cat litter area. A cleaning rake is arranged on the movable shaft, and two guide rail grooves are formed on an inner side wall of the box body to direct the movement of the movable shaft. The movable shaft drives the cleaning rake to move along the guide rail grooves, such that the cleaning rake separates the cat litter and the cat excrement in the cat litter area.

3 Claims, 6 Drawing Sheets

(56)  References Cited

U.S. PATENT DOCUMENTS

| | | | | |
|---|---|---|---|---|
| 8,061,301 | B1 * | 11/2011 | Tsengas | A01K 1/0114 |
| | | | | 96/135 |
| 8,109,237 | B1 * | 2/2012 | Tsengas | A01K 1/0114 |
| | | | | 119/616 |
| 8,109,238 | B2 * | 2/2012 | Casiana | A01K 1/011 |
| | | | | 119/161 |
| 8,166,918 | B2 * | 5/2012 | Cook | A01K 1/011 |
| | | | | 229/169 |
| 8,567,348 | B2 * | 10/2013 | Cook | A01K 1/0114 |
| | | | | 119/161 |
| 9,179,643 | B2 * | 11/2015 | Loveday | A01K 1/011 |
| 9,526,226 | B2 * | 12/2016 | Plazarte | A01K 1/0114 |
| 2021/0251182 | A1 * | 8/2021 | Anderson | A01K 1/011 |
| 2022/0240480 | A1 * | 8/2022 | Noh | A01K 1/0114 |
| 2023/0301268 | A1 * | 9/2023 | Zhang | A01K 1/0114 |
| 2023/0371465 | A1 * | 11/2023 | Kim | A01K 1/011 |
| 2024/0196855 | A1 * | 6/2024 | Graves | A01K 1/011 |

FOREIGN PATENT DOCUMENTS

| | | | | |
|---|---|---|---|---|
| CN | 116420625 | A * | 7/2023 | |
| WO | WO-2013192498 | A1 * | 12/2013 | A01K 1/011 |

* cited by examiner

PET BEDPAN

INCORPORATION BY REFERENCE

This application claims priority to China Patent Application No.: 2024204194791 filed 2024 Jul. 26, China Patent Application No.: 2024204169588, filed 2024 Jul. 26, and Patent China Application No.: 2024204142246, filed 2024 Jul. 26, the contents of each of which are hereby incorporated by reference in their entirety.

TECHNICAL FIELD

The present disclosure relates to the technical field of pet supplies, and particularly relates to a pet bedpan.

BACKGROUND

Cats are a kind of household pets popular worldwide, having their own unique character features. Cats like cleanliness and are very alert, and bury their excrement after defecation. At present, a breeder usually prepares a pet bedpan before breeding a cat, and then trains the cat to defecate in the pet bedpan, manually removing excrement discharged by the cat. However, pet bedpans on the market in the prior art have limited functions, requiring manual removal of excrement discharged by cats.

A U.S. patent with the publication No. US 20210251182A1 discloses an automated self-cleaning litter box with a disposable receptacle. The litter box includes a guide arrangement to allow for slidably mounting a disposable litter receptacle. The litter box further includes a ramp, a catch basin and a removable mat. Further, an electric drive mechanism is included and connected to a casing body, the electric drive mechanism drives a rake inside the casing body, and a cam is fixedly mounted on the rake. A movable cover component is designed and arranged to cover and expose an opening of the litter receptacle, and the movable cover component can move according to the meshing situation of the cam. A guide rail device is located inside the casing body and is designed and arranged to receive the litter receptacle. The electric drive mechanism drives the rake, the rake moves the cat excrement from the litter box into the litter receptacle, without need to come into close contact with pet excrement by a pet owner, because the litter box can be automatically cleaned in a mechanical manner. A disposable container is arranged in the litter receptacle, and when the disposable container is full, the disposable container can be taken out and replaced with a new container.

However, the disposable container is provided with an upper cover, and the upper cover, in a working state, is embedded into a bottom of a cover plate. When it is needed to remove the disposable container, the upper cover embedded into the bottom of the cover plate is removed and covers the disposable container. In this process, the excrement inside the disposable container is still inevitably exposed to the air, thereby causing unpleasant odors in the air. Further, the rake cannot be detached from the electric drive mechanism, and after repeated use, dirt inevitably accumulates on the rake, which makes it inconvenient to clean the rake.

SUMMARY

The present disclosure aims to solve the technical problems of possibly coming into close contact with pet excrement when replacing a disposable receptacle and encountering difficulty of cleaning a rake.

In order to solve the above technical problems, the present disclosure provides a pet bedpan. The pet bedpan includes a box body and a cleaning assembly, where the cleaning assembly is arranged on the box body; a cat litter area for a cat to defecate and a collection bin for collecting cat excrement are arranged in the box body, the collection bin is arranged to be adjacent to and side by side with the cat litter area, two guide rail grooves are formed on an inner side wall of the box body, and the guide rail grooves are located above the cat litter area and the collection bin; the cleaning assembly includes a movable shaft and a cleaning rake, where the cleaning rake is detachably connected to the movable shaft through a locking block, and end portions of the movable shaft are movably arranged in the guide rail grooves, such that the movable shaft moves back and forth in the cat litter area; and a clamping part is arranged on the locking block, a clamping groove is formed on the cleaning rake, and the clamping part can be clamped into the clamping groove, such that the cleaning rake is detachably secured on the movable shaft.

According to the technical solution, the movable shaft moves back and forth in the cat litter area, the cleaning rake is detachably arranged on the movable shaft, and when the movable shaft moves back and forth in the cat litter area, the cleaning rake collects the cat excrement into the collection bin without the need for a user to come into close contact with the cat excrement; and when the cleaning rake has hard-to-remove stains, the cleaning rake is detached through the locking block for separate cleaning, and after cleaning and drying, the cleaning rake is remounted on the movable shaft.

The present disclosure further provides a pet bedpan, including a box body and a collection bin, where the collection bin is detachably connected to the box body; a cat litter area for a cat to defecate and a cat excrement area in communication with the cat litter area are arranged in the box body, where the cat excrement area is arranged to be adjacent to and side by side with the cat litter area, a keel support is arranged between the cat litter area and the cat excrement area, a bin lid capable of flipping up and down is arranged in the cat excrement area, and the collection bin is mounted in the cat excrement area; a collection chamber with an opening at its top is arranged in the collection bin for the purpose of cat excrement collection; the bin lid covers the opening on the top of the collection chamber, an upper housing for sleeving and securing a garbage bag is arranged at a top of the collection bin, and the upper housing is arranged in a way of surrounding a top opening of the collection bin in a circumferential direction; and a movable wall is arranged at a top of the upper housing, the movable wall is in hinged connection with the upper housing, the movable wall is capable of swinging up and down relative to the upper housing, and a top opening is formed by enclosing between the movable wall and the upper housing.

According to the technical solution, the foldable bin lid is arranged above the collection bin to prevent odors from cat excrement in the collection bin from dispersing, the upper housing is arranged above the collection bin, and a plastic bag is fixedly placed in the collection bin through the upper housing. Further, a movable wall is arranged at a top of a side of the upper housing, the movable wall is capable of swinging up and down relative to the upper housing, and the collection chamber above the collection bin is formed by enclosing between the movable wall and the upper housing. When the plastic bag inside the collection bin needs to be replaced, a user only needs to pull the plastic bag. In this case, the plastic bag drives the movable wall to swing downward. When the movable wall swings downward to a certain angle, an upper peripheral edge of the plastic bag is detached from the upper housing, thereby making it convenient for the user to replace the disposable receptacle inside the collection bin.

The present disclosure further provides a pet bedpan, including a box body, a cleaning assembly and a collection bin, where the cleaning assembly and the collection bin are mounted in the box body; a cat litter area for a cat to defecate and a collection bin for collecting cat excrement are arranged in the box body, the collection bin is arranged to be adjacent to and side by side with the cat litter area, two guide rail grooves are formed on an inner side wall of the box body, and the guide rail grooves are located above the cat litter area and the collection bin; the cleaning assembly includes a movable shaft and a cleaning rake, where the cleaning rake is detachably connected to the movable shaft through a locking block, and end portions of the movable shaft are movably arranged in the guide rail grooves, such that the movable shaft moves back and forth in the cat litter area; a clamping part is arranged on the locking block, a clamping groove is formed on the cleaning rake, and the clamping part can be clamped into the clamping groove, such that the cleaning rake is detachably secured on the movable shaft; when the cat defecates on cat litter in the cat litter area, the movable shaft drives the cleaning rake to move along a guide rail, and the cleaning rake rakes out the cat excrement from the cat litter; in the process that the cleaning rake moves along the guide rail grooves for cleaning, the movable shaft opens the bin lid upward, and after the cleaning rake pours the cat excrement into the collection bin, the movable shaft drives the cleaning rake to return to an original position; a collection chamber with an opening at its top is arranged in the collection bin for the purpose of cat excrement collection; the bin lid covers the opening on the top of the collection chamber, an upper housing for sleeving and securing a garbage bag is arranged at a top of the collection bin, and the upper housing is arranged in a way of surrounding a top opening of the collection bin in a circumferential direction; a movable wall is arranged at a top of the upper housing, the movable wall is in hinged connection with the upper housing, the movable wall is capable of swinging up and down relative to the upper housing, and a top opening is formed by enclosing between the movable wall and the upper housing; and a bottom wall is arranged on the upper housing in an inclined and protruding manner and faces an upward side of the collection chamber, the bottom wall is arranged in a way of surrounding the top of the collection bin in a circumferential direction, and an outer wall is further arranged on the upper housing, where an outer side of the outer wall is exposed outside the cat excrement area, a bottom of the outer wall butt-joints with a bottom of the bottom wall, and a fixed wall is further arranged on the upper housing; and a bottom of the fixed wall butt-joints with a bottom of the bottom wall, the fixed wall and the outer wall are spaced apart from each other in a relative manner, and the outer wall is provided with a drawstring notch for sealing the garbage bag with a drawstring.

According to the technical solution, the movable shaft drives the cleaning rake to move along the guide rail grooves, such that the cleaning rake separates the cat litter and the cat excrement in the cat litter area, and the movable shaft drives the cleaning rake to push the bin lid upward in a swinging manner and pour the collected cat excrement into the collection bin; the bin lid is used to seal the odors of the cat excrement and prevent any pet from accidentally touching the cat excrement; the plastic bag with a drawstring for sealing is sleeved on the collection bin, the drawstring extends out of the collection bin through a drawstring notch, and when the plastic bag needs to be replaced, the user only needs to pull the drawstring; in this case, an opening of the plastic bag drives the movable wall on the collection bin to swing downward, and when the movable wall swings downward to a certain position, the plastic bag sleeved on the collection bin is detached from the collection bin; in this case, the drawstring is further pulled until the opening of the plastic bag reaches the drawstring notch, and the drawstring is further pulled until the opening of the plastic bag is closed at the drawstring notch; in this case, the bin lid is opened to take out of the plastic bag, without need to come into close contact with pet excrement in the whole process; and further, when the cleaning rake has stains, the cleaning rake is detached from the movable shaft through the locking block, the cleaning rake is separately cleaned, and after drying, the cleaning rake is re-mounted on the movable shaft.

REFERENCE NUMERALS IN FIGURES

Figure 1:
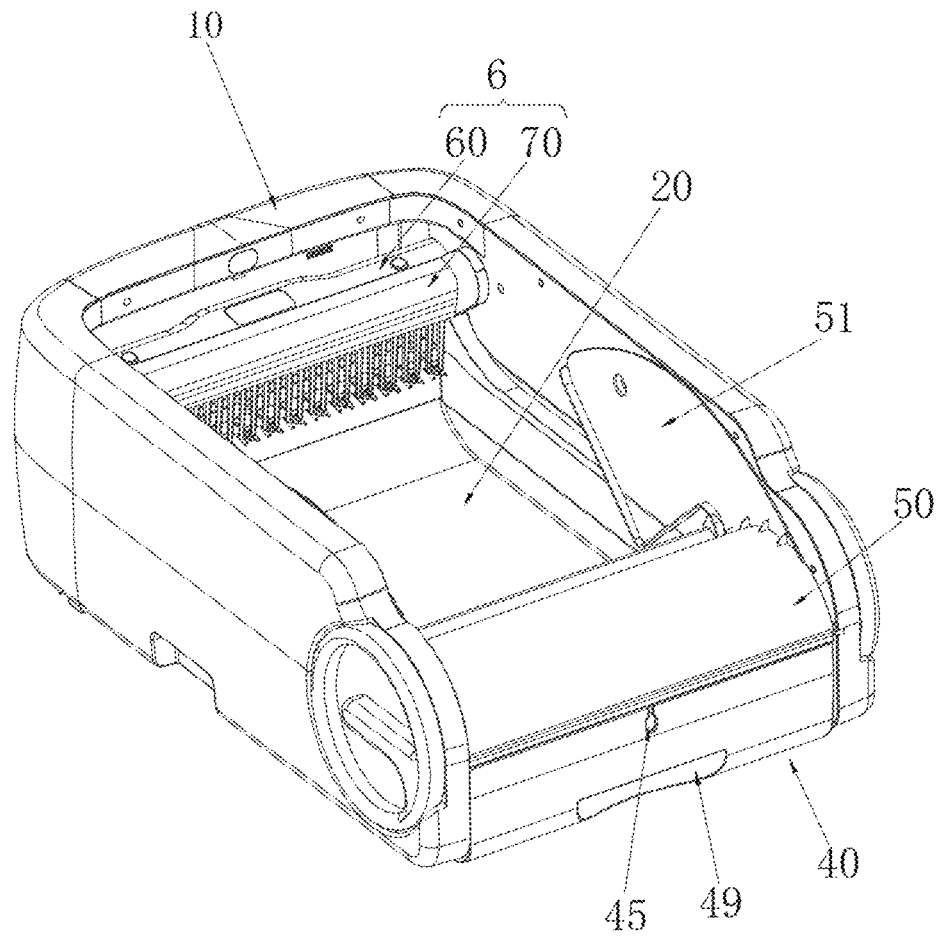
FIG. 1 is a schematic diagram of an overall structure according to an embodiment of the present disclosure.
Figure 2:
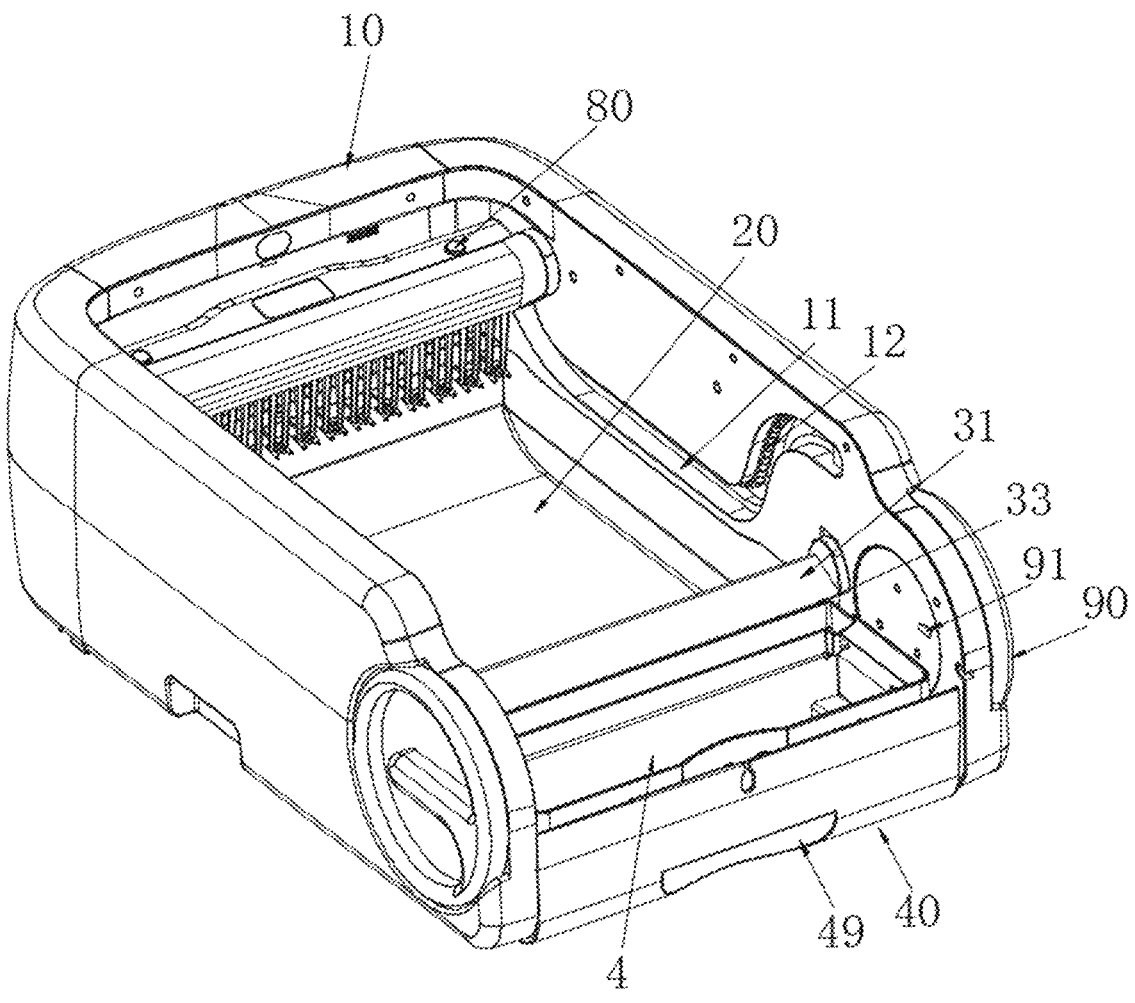
FIG. 2 is a schematic structural diagram of the present disclosure with a bin lid removed according to an embodiment.
Figure 3:
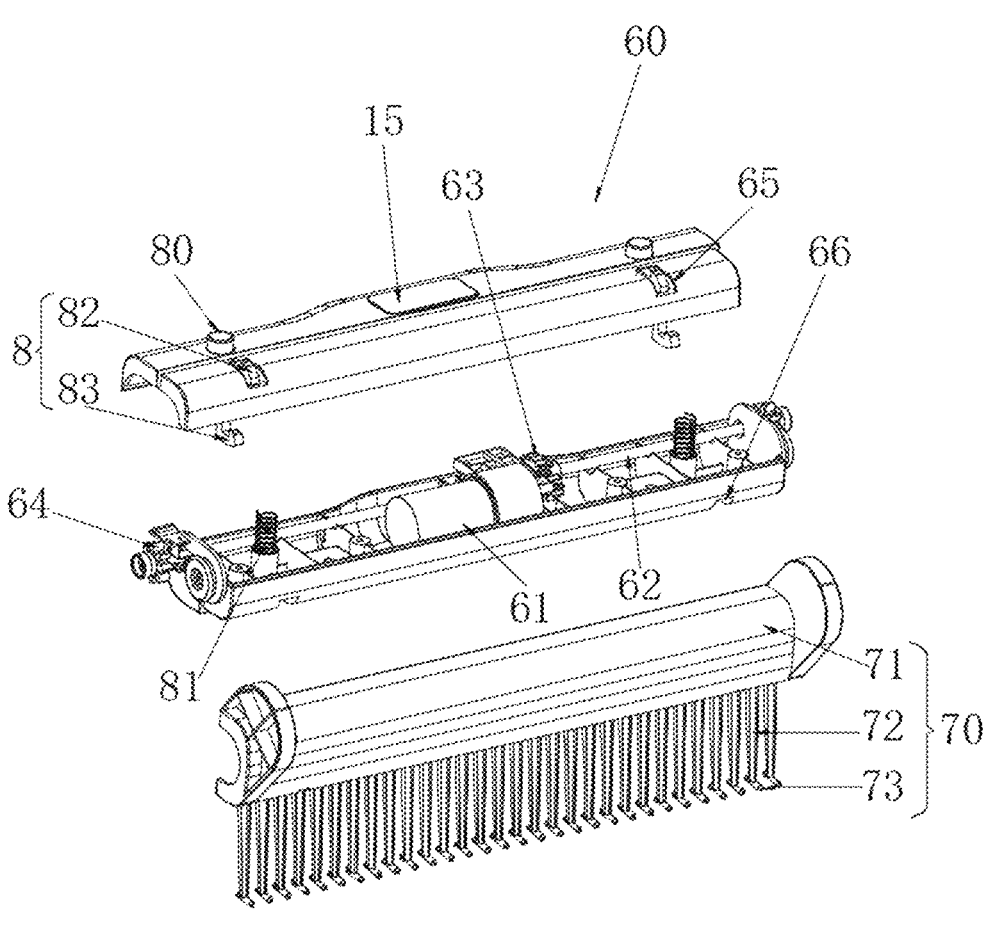
FIG. 3 is a schematic diagram of a breakdown structure of a movable shaft and a cleaning rake according to an embodiment of the present disclosure.
Figure 4:
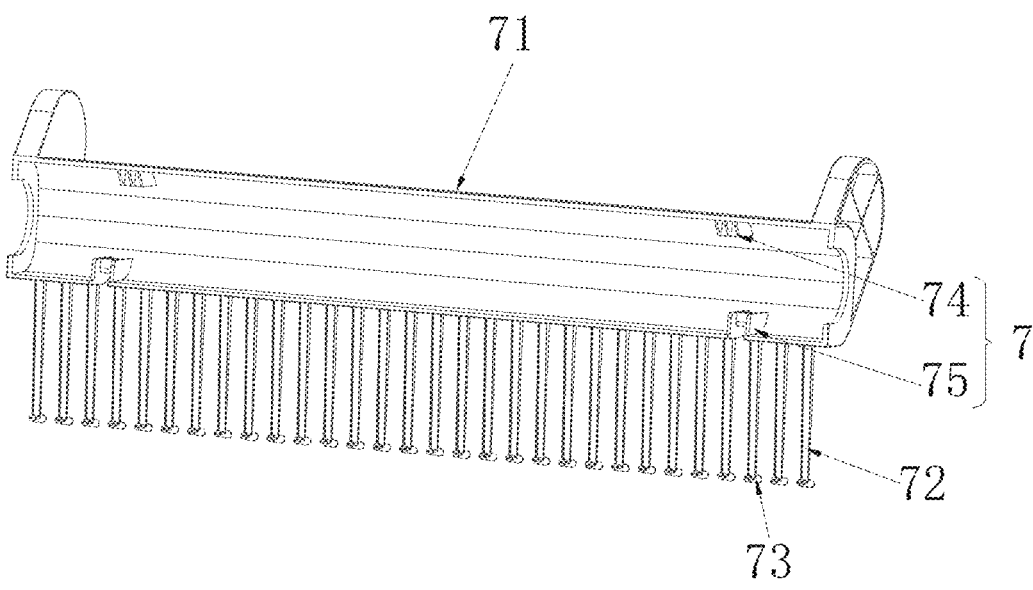
FIG. 4 is a three-dimensional schematic diagram of a rear view of a cleaning rake according to an embodiment of the present disclosure.
Figure 5:
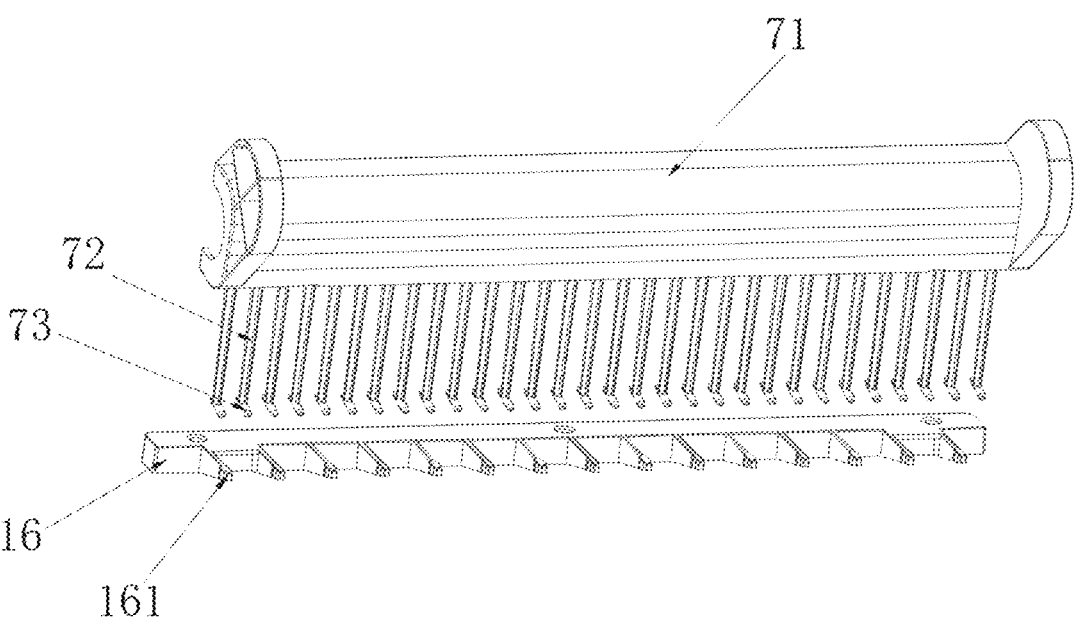
FIG. 5 is a schematic diagram of a breakdown structure of a cleaning rake and a finishing rake according to an embodiment of the present disclosure.
Figure 6:
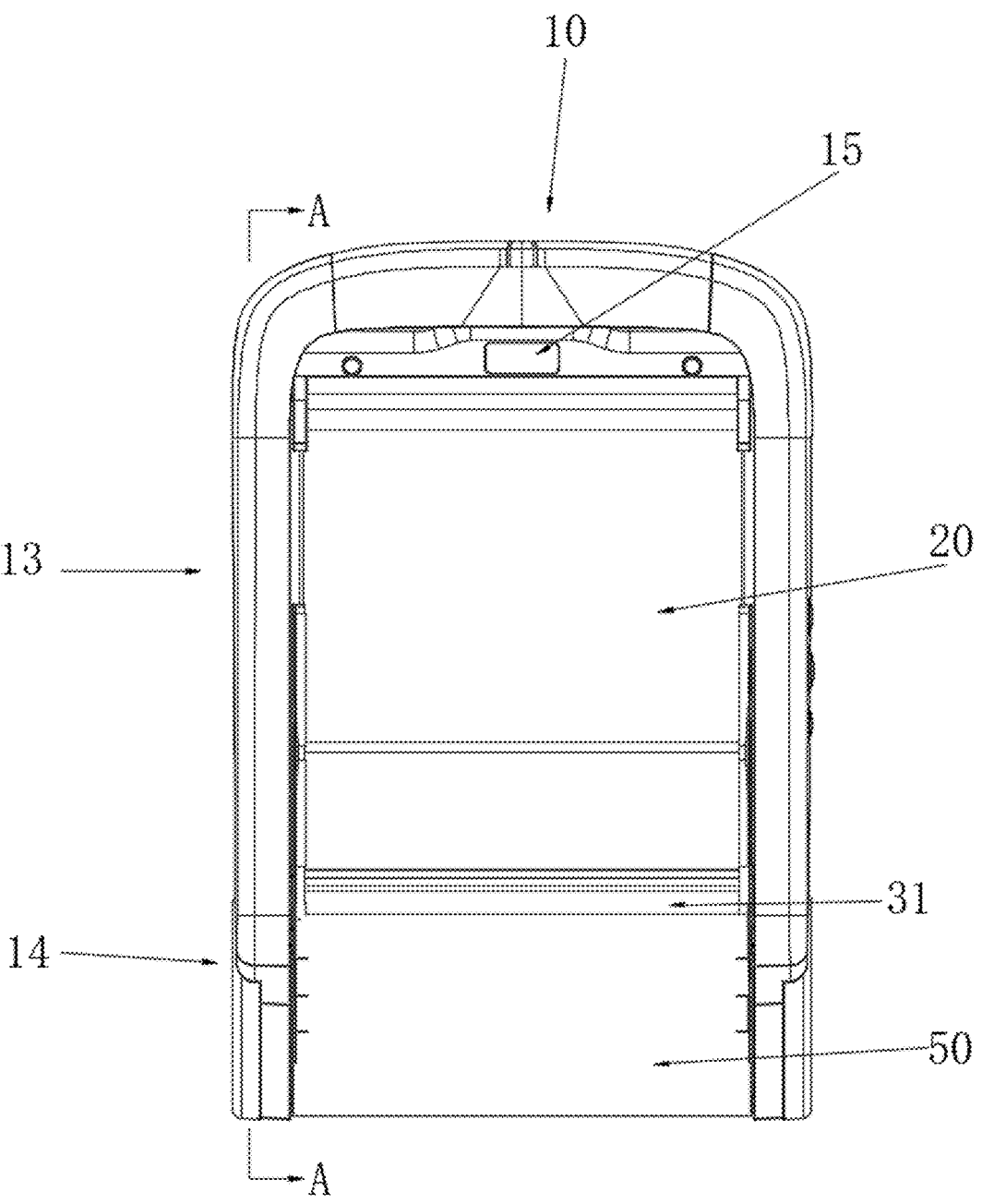
FIG. 6 is a top view of an embodiment of the present disclosure.
Figure 7:
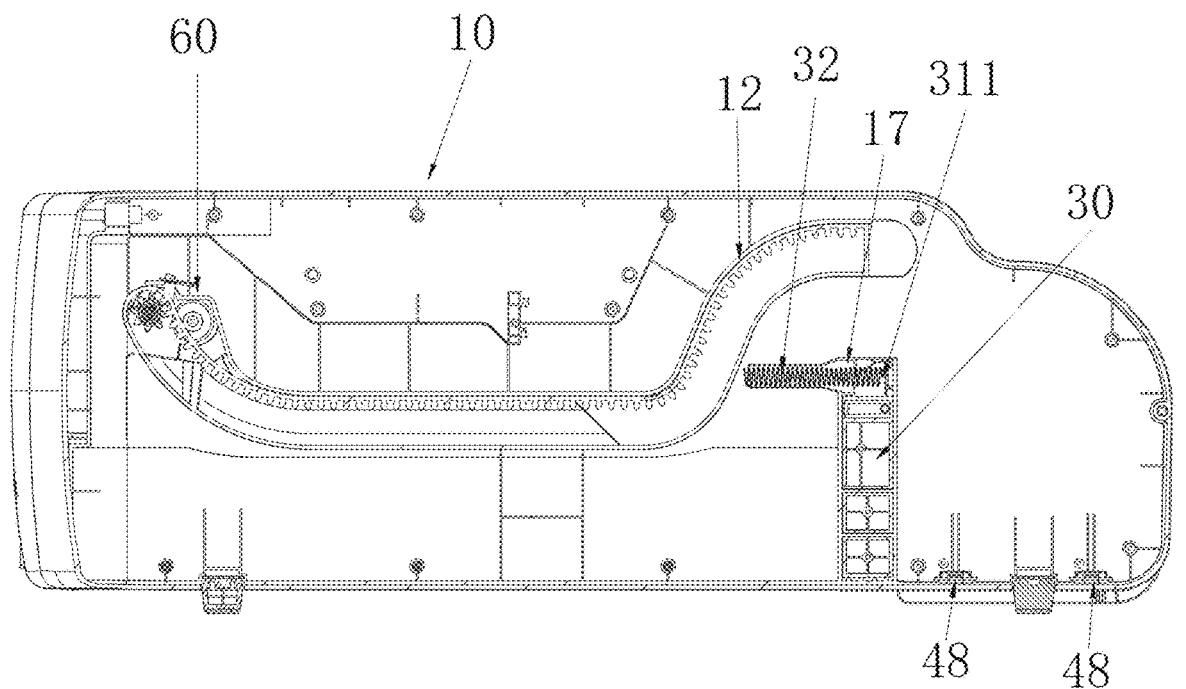
FIG. 7 is a sectional view of A-A in FIG. 6.

6. cleaning assembly; 8. clamping part; 7. clamping groove; 4. collection chamber; 10. box body; 20. sand tray; 30. keel support; 40. collection bin; 50. bin lid; 60. movable shaft; 70. cleaning rake; 80. locking block; 90. rotating plate; 11. guide rail groove; 12. rack rail; 13. cat litter area; 14. cat excrement area; 15. operation panel; 16. finishing rake; 161. finishing rake strip; 17. connection chamber; 31. guide inclined plate; 311. connection column; 32. elastic member; 33. mounting gap; 41. upper housing; 42. bottom wall; 43. outer wall; 44. fixed wall; 45. drawstring notch; 46. movable wall; 47. torsional spring; 48. weighing sensor; 49. push-pull groove; 51. side wall push plate; 61. gear motor; 62. transmission shaft; 63. driving gear; 64. driven gear; 65. upper groove; 66. lower groove; 71. rake support; 72. rake strip; 73. rake head; 74. upper clamping groove; 75. lower clamping groove; 81. switch spring; 82. upper clamping block; 83. lower clamping block; and 91. top strip.

DETAILED DESCRIPTIONS OF THE EMBODIMENTS

The present disclosure will be further described in detail below with reference to accompanying drawings and specific embodiments.

As illustrated in FIGS. 1-8, a pet bedpan for easy cleaning and collection of cat excrement includes a box body 10, and a cat litter area 13 for a cat to defecate and a cat excrement area 14 in communication with the cat litter area 13 are arranged in the box body 10, where the cat excrement area 14 is arranged to be adjacent to and side by side with the cat litter area 13; a keel support 30 is arranged between the cat litter area 13 and the cat excrement area 14, a collection bin 40 for collecting cat excrement is mounted in the cat excrement area 14, and a collection chamber with an opening at its top is arranged in the collection bin 40 for the purpose of cat excrement collection; and a bin lid 50 capable of flipping up and down is arranged in the cat excrement area 14, the bin lid 50 covers the opening on the top of the collection chamber, and the collection bin 40 is detachably connected to the box body 10.

A cleaning assembly 6 is arranged in the cat litter area 13, and the cleaning assembly 6 includes a movable shaft 60 that moves back and forth in the cat litter area 13 and a cleaning rake 70 that is arranged on the movable shaft 60 and sweeps the cat excrement into the collection bin 40, where the cleaning rake 70 is detachably connected to the movable shaft 60 through a locking block 80; the locking block 80 is provided with a clamping part 8, a clamping groove 7 is formed on the cleaning rake 70, and the clamping part 8 can be clamped into the clamping groove 7, such that the cleaning rake 70 is detachably secured on the movable shaft 60; and two guide rail grooves 11 are formed on an inner side wall of the box body 10 to direct the movement of the movable shaft 60, the guide rail grooves 11 are located in the cat litter area 13 and the cat excrement area 14, and end portions of the movable shaft 60 are movably arranged in the guide rail grooves 11.

When the cat defecates on cat litter in the cat litter area 13, the movable shaft 60 drives the cleaning rake 70 to move along a guide rail, and the cleaning rake 70 rakes out the cat excrement from the cat litter; and in the process that the cleaning rake 70 moves along the guide rail grooves 11 for cleaning, the movable shaft 60 opens the bin lid 50 upward, and after the cleaning rake 70 pours the cat excrement into the collection bin 40, the movable shaft 60 drives the cleaning rake 70 to return to an original position.

In the pet bedpan for easy cleaning and collection of cat excrement, the movable shaft 60 drives the cleaning rake 70 to move along the guide rail grooves 11, such that the cleaning rake 70 separates the cat litter and the cat excrement in the cat litter area 13, and the movable shaft 60 drives the cleaning rake 70 to push the bin lid 50 upward in a swinging manner and pour the collected cat excrement into the collection bin 40; and the bin lid 50 is used to seal the odors of the cat excrement and prevent any pet from accidentally touching the cat excrement, which solves the problem of single functions of pet bedpans.

In this embodiment, a gear motor 61 and a transmission shaft 62 are arranged in the movable shaft 60, the gear motor 61 is in transmission connection with the transmission shaft 62 through a driving gear 63, the driving gear 63 is sleeved on the transmission shaft 62, driven gears 64 are sleeved at both ends of the transmission shaft 62 respectively, and the driven gears 64 are meshed with the guide rail grooves 11.

Rack rails 12 are arranged in the guide rail grooves 11, and the rack rails 12 are arranged in a way of extending a length direction of the guide rail grooves 11.

The movable shaft 60, through the gear motor 61, drives the driving gear 63 to drive the transmission shaft 62 to rotate, and the transmission shaft 62, through the driven gears 64 and the guide rail grooves 11 meshed with each other, drives the entire movable shaft 60 to move back and forth in a direction of the guide rail grooves 11, which enables to achieve a function, i.e., the movable shaft 60 drives the cleaning rake 70 to clean the cat excrement and return to an initial position.

The guide rail grooves 11 can be meshed with the driven gears 64 through the rack rails 12, which increases the stability of the movable shaft 60 during movement.

In this embodiment, the cleaning rake 70 includes a rake support 71, a plurality of rake strips 72 are longitudinally arranged on the rake support 71, and the plurality of rake strips 72 are sequentially arranged side by side and spaced apart from each other in a length direction of the rake support 71; and the rake support 71 is capable of filtering out the cat litter through gaps between the plurality of rake strips 72 and then separating the cat excrement through the plurality of rake strips 72.

Tops of the rake strips 72 are fixedly connected to the rake support 71, rake heads 73 are arranged at bottoms of the rake strips 72, and the rake heads 73 are obliquely arranged at the bottoms of the rake strips 72.

The rake strips 72 are capable of temporarily retaining the cat excrement through the rake heads 73, preventing the collected cat excrement from falling back into the cat litter, and avoiding the scattering of cat excrement due to friction with an inner side wall of the cat litter area 13 in the movement process, thereby enhancing environmental hygiene.

A finishing rake 16 is arranged on a side wall of the box body 10 at the initial position, the finishing rake 16 includes a plurality of horizontally arranged finishing rake strips 161, and the finishing rake 16 and the cleaning rake 70 are perpendicular to each other; the plurality of finishing rake strips 161 are horizontally arranged at an equal interval, and the finishing rake strips 161 extend into gaps between the rake strips 72 and the rake strips 72; and when the movable shaft 60 returns to the initial position, the cleaning rake 70 perpendicularly intersects with the finishing rake 16, and the finishing rake strips 161 remove any cat excrement that may have adhered to the cleaning rake 70.

In this embodiment, a bottom of the locking block 80 is inserted into the movable shaft 60 from top to bottom, the bottom of the locking block 80 is connected to the movable shaft 60 through a switch spring 81, and a top of the locking block 80 is exposed outside the movable shaft 60; the clamping part 8 includes an upper clamping block 82 and a lower clamping block 83, the upper clamping block 82 is arranged in a middle-upper portion of an outer side of the locking block 80, and the lower clamping block 83 is arranged in middle-lower portion of the outer side of the locking block 80; the upper clamping block 82 is exposed outside a top of the movable shaft 60, the lower clamping block 83 is exposed outside a bottom of the movable shaft 60, and the upper clamping block 82 and the lower clamping block 83 are arranged up and down in a staggered manner; and the clamping groove 7 includes an upper clamping groove 74 and a lower clamping groove 75, both the upper clamping groove 74 and the lower clamping groove 75 are arranged on the rake support 71, the rake support 71 and the movable shaft 60 are buckled to each other through the upper clamping groove 74 and the upper clamping block 82, and the lower clamping groove 75 is connected to the lower clamping block 83 in a buckled manner.

The switch spring 81 is capable of driving the locking block 80 to move in a resetting manner, which allows flexible control of disassembly between the rake support 71 and the movable shaft 60, and enables the movable shaft 60 to drive the rake support 71 to move for operation.

The locking block 80 is connected to the lower clamping groove 75 of the rake support 71 through the lower clamping block 83 in a buckled manner to enhance the stability of mounting between the rake support 71 and the movable shaft 60, and the up-down arrangement of the upper clamping block 82 and the lower clamping block 83 in a staggered manner can increase an area of mounting and locking, thus enhancing the stability of structural connection between the two components.

An upper groove 65 inwardly recessed is formed at the top of the movable shaft 60, the upper clamping block 82 is located in the upper groove 65, a lower groove 66 inwardly recessed is formed at the bottom of the movable shaft 60, and the lower clamping block 83 is located in the lower groove 66.

When the rake support 71 is mounted on the movable shaft 60, the upper clamping groove 74 abuts against an inner side wall of the upper groove 65, the upper clamping block 82 is embedded in the upper clamping groove 74, the lower clamping groove 75 abuts against an inner side wall of the lower groove 66, and the lower clamping block 83 is embedded in the lower clamping groove 75.

The movable shaft 60, through the upper groove 65 and the lower groove 66, achieves positioning and mounting of the upper clamping groove 74 and the lower clamping groove 75 in the rake support 71, which prevents wobbling of the cleaning rake 70 in the process that the movable shaft 60 drives the cleaning rake 70 to move for operation.

In this embodiment, an upper housing 41 for sleeving and securing a garbage bag is arranged at a top of the collection bin 40, and the upper housing 41 is arranged in a way of surrounding an opening of the top of the collection bin 40 in a circumferential direction; and the collection bin 40 is detachably connected to the upper housing 41, the upper housing 41 is arranged in a surrounding manner, and the collection bin 40, through edges of a top of the upper housing 41, is capable of sleeving edges of an opening of the garbage bag, thereby increasing stability of securing the garbage bag.

A bottom wall 42 is arranged at the top of the upper housing 41 in an inclined and protruding manner and faces an upward side of the collection chamber, the bottom wall 42 is arranged in a way of surrounding the top of the upper housing 41 in a circumferential direction, and an outer wall 43 protrudes upward at the top of the upper housing 41; an outer side of the outer wall 43 is exposed outside the cat excrement area 14, a bottom of the outer wall 43 butt-joints with a bottom of the bottom wall 42, and a fixed wall 44 is arranged at a top of the bottom wall 42 in an upward, vertical and protruding manner; and the fixed wall 44 and the outer wall 43 are spaced apart from each other in a relative manner, and the outer wall 43 is provided with a drawstring notch 45 for sealing the garbage bag with a drawstring.

A placement crack is formed above the bottom wall 42, and the edges of an opening of the garbage bag can be vertically placed in the placement crack; and the drawstring for sealing the garbage bag can penetrate a gap between the fixed wall 44 and the outer wall 43 to extend outside the drawstring notch 45, such that in order to seal the garbage bag, all that is needed is to pull the sealing drawstring outward. The edges of an opening of the garbage bag can be bound and tightened through the sealing drawstring.

Figure 8:
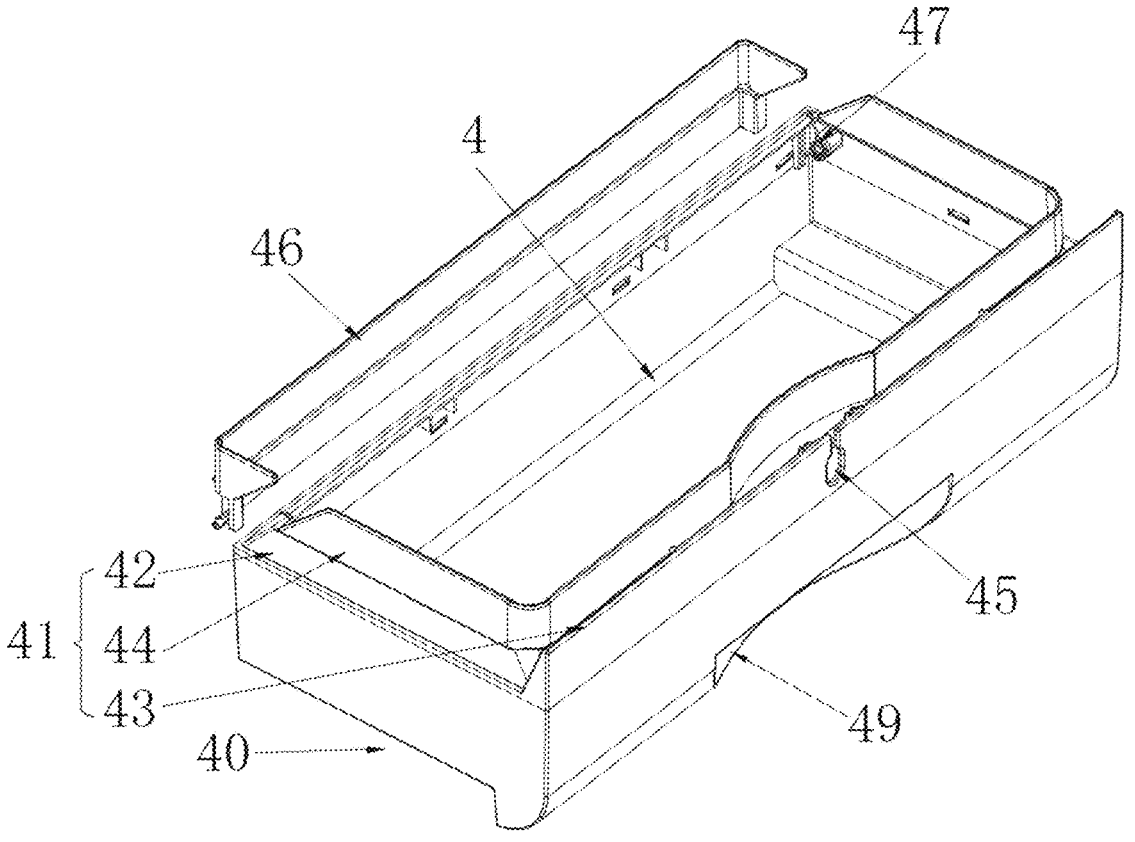
FIG. 8 is a schematic diagram of a breakdown structure of a collection bin according to an embodiment of the present disclosure.

As illustrated in FIG. 8, in this embodiment, a movable wall 46 that swings through its bottom is arranged on the top of the bottom wall 42, the movable wall 46 and the fixed wall 44 are spaced apart from each other in a relative manner, the movable wall 46 is in hinged connection with the upper housing 41, and a torsional spring 47 is mounted between the movable wall 46 and the upper housing 41, such that the torsional spring 47 is capable of driving the movable wall 46 to return to its original position; and a top opening is formed by enclosing between the movable wall 46 and the fixed wall 44 such that the edges of an opening of the garbage bag can be sleeved, thereby securing the garbage bag.

The upper housing 41 and the movable wall 46 allow the edges of an opening of the garbage bag to be sleeved, thereby securing the garbage bag, and in order to seal the garbage bag, all that is needed is to pull the sealing drawstring outward; and in this case, the movable wall 46 is inclined and the garbage bag is detached from the movable wall 46, which facilitates contracting of an opening of the garbage bag, and prevents damage to the edges of an opening of the garbage bag due to tension in the process of sealing the garbage bag.

In this embodiment, the movable wall 46 and the keel support 30 are spaced apart from each other in a relative manner to form a mounting gap 33, a guide inclined plate 31 is further arranged between the box body 10 and the collection bin 40, and the guide inclined plate 31 is located above the keel support 30; connection columns 311 are arranged at both ends of the guide inclined plate 31, connection chambers 17 are arranged on inner side walls of two opposite sides of the box body 10, and the connection columns 311 on both ends of the guide inclined plate 31 are inserted into the connection chambers 17; and an elastic member 32 is arranged between each of the connection columns 311 and each of the connection chambers 17, one end of the elastic member 32 is sleeved on one corresponding connection column 311, and the other end of the elastic member 32 abuts against a bottom of one corresponding connection chamber 17.

When the movable shaft 60 moves to clean the cat excrement, the bin lid 50 compresses the guide inclined plate 31 toward the cat litter area 13 in an initial state; when the movable shaft 60 drives the cleaning rake 70 to push the side wall push plate 51, the side wall push plate 51 drives the bin lid 50 to rotate upward, and pressure of the bin lid 50 on the guide inclined plate 31 gradually decreases; and in this case, the elastic member 32 pushes the guide inclined plate 31 toward the cat excrement area 14, such that the guide inclined plate 31 is pushed onto the mounting gap 33, so as to prevent cat excrement on the cleaning rake 70 from falling into the mounting gap 33.

In this embodiment, a level of the fixed wall 44 is higher than a level of the outer wall 43, an outer end of the bin lid 50 butt-joints with a top of the outer wall 43, and when the collection bin 40 is pulled out of the box body 10 randomly, an outer end of the bin lid 50 blocks the fixed wall 44, to prevent the collection bin 40 from being pulled out of the box body 10 randomly; and when the outer end of the bin lid 50 swings inward to tops of the fixed wall 44 and the outer wall 43 that are spaced apart from each other, the outer end of the bin lid 50 no longer blocks the fixed wall 44, such that the collection bin 40 can be detached from the box body 10.

An inner end of the bin lid 50 is inserted into the mounting gap 33, and the mounting gap 33 is capable of enhancing the stability of sealing the collection bin 40 with the bin lid 50; and both sides of the bin lid 50 extend toward the guide rail grooves 11 respectively to form the side wall push plate 51, and the side wall push plate 51 covers part of the guide rail grooves 11.

The box body 10 seals the collection bin 40 through the bin lid 50, to prevent the odors of cat excrement in the collection bin 40 from affecting the surrounding environment and avoid accidental touch of the cat excrement by a pet cat or any other animal.

When the movable shaft 60 moves to clean the cat excrement, the movable shaft 60, by pushing the side wall push plate 51, pushes the entire bin lid 50 upward in a swinging manner, such that the cleaning rake 70 is capable of pouring the cat excrement into the collection bin 40.

In this embodiment, a rotating plate 90 is arranged on the box body 10, the rotating plate 90 and the collection bin 40 are arranged in a relative manner, a top strip 91 that drives the bin lid 50 to swing upward is arranged on the rotating plate 90, the top strip 91 is located in the cat excrement area 14, and the top strip 91 and the bin lid 50 are movably abutted against each other.

When the rotating plate 90 drives the top strip 91 to drive the bin lid 50 to swing upward to a predetermined position, the outer end of the bin lid 50 no longer blocks the fixed wall 44, such that the collection bin 40 can be detached from the box body 10.

In this embodiment, a sand tray 20 is arranged in the cat litter area 13, the sand tray 20 is detachably connected to the box body 10, and the sand tray 20 is arranged to be adjacent to and side by side with the collection bin 40; and weighing sensors 48 are arranged at the bottoms of both the sand tray 20 and the collection bin 40, and an outer side of the collection bin 40 is recessed inward to form a push-pull groove 49.

The weighing sensors 48 are capable of sending weight signals of the sand tray 20 and the collection bin 40 to a mobile phone of a user, and reminding the user to clean the cat excrement from the sand tray 20 or the collection bin 40; and the push-pull groove 49 facilitates the push-pull movement of the collection bin 40 inside the box body 10.

An ozone generator and an ultrasonic sensor are arranged in the box body 10, and the ozone generator and the ultrasonic sensor both face the cat litter area 13, where the ozone generator is capable of disinfecting any odors in the cat litter area 13, and the ultrasonic sensor is capable of monitoring the presence of a cat in the cat litter area 13. When a cat is detected, the ultrasonic sensor will control the movable shaft 60 to stop working.

In this embodiment, an operation panel 15 is arranged on an outer side of the box body 10, the operation panel 15 is electrically connected to the movable shaft 60, and the operation panel 15 sends instructions to the movable shaft 60 to control a working state of the movable shaft 60.

What is claimed is:

1. A pet bedpan, comprising a box body and a cleaning assembly, wherein the cleaning assembly is arranged on the box body;

a cat litter area for a cat to defecate and a collection bin for collecting cat excrement are arranged in the box body, the collection bin is arranged to be adjacent to and side by side with the cat litter area, two guide rail grooves are formed on an inner side wall of the box body, and the guide rail grooves are located above the cat litter area and the collection bin;

the cleaning assembly comprises a movable shaft and a cleaning rake, wherein the cleaning rake is detachably connected to the movable shaft through a locking block, and end portions of the movable shaft are movably arranged in the guide rail grooves, such that the movable shaft moves back and forth in the cat litter area;

a clamping part is arranged on the locking block, a clamping groove is formed on the cleaning rake, and the clamping part is configured to be clamped into the clamping groove, such that the cleaning rake is detachably secured on the movable shaft;

a bottom of the locking block is inserted into the movable shaft from top to bottom, the bottom of the locking block is connected to the movable shaft through a switch spring, and a top of the locking block is exposed outside the movable shaft; and the clamping part comprises an upper clamping block and a lower clamping block, the upper clamping block is arranged in a middle-upper portion of an outer side of the locking block, and the lower clamping block is arranged in a middle-lower portion of the outer side of the locking block; and the upper clamping block is exposed outside a top of the movable shaft, the lower clamping block is exposed outside a bottom of the movable shaft, and the upper clamping block and the lower clamping block are arranged up and down in a staggered manner.

2. The pet bedpan according to claim 1, wherein the clamping groove comprises an upper clamping groove and a lower clamping groove, both the upper clamping groove and the lower clamping groove are arranged on a rake support, the rake support and the movable shaft are buckled to each other through the upper clamping groove and the upper clamping block, and the lower clamping groove is connected to the lower clamping block in a buckled manner.

3. The pet bedpan according to claim 2, wherein an upper groove inwardly recessed is formed at the top of the movable shaft, the upper clamping block is located in the upper groove, a lower groove inwardly recessed is formed at the bottom of the movable shaft, and the lower clamping block is located in the lower groove; and when the rake support is mounted on the movable shaft, the upper clamping groove abuts against an inner side wall of the upper groove, the upper clamping block is embedded in the upper clamping groove, the lower clamping groove abuts against an inner side wall of the lower groove, and the lower clamping block is embedded in the lower clamping groove.

\* \* \* \* \*